US012787051B2

(12) United States Patent

Newberg et al.

(10) Patent No.: US 12,787,051 B2

(45) Date of Patent: *Nov. 3, 2026

(54) PRIORITY INTERNET ACCESS VIA NETWORKS DURING EMERGENCY SITUATIONS

(71) Applicant: Charter Communications Operating, LLC, St. Louis, MO (US)

(72) Inventors: Shane Newberg, Aurora, CO (US); Donald Sherker, Parker, CO (US); Peter Andrew Ericksen, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 279 days.

This patent is subject to a terminal disclaimer.

(21) Appl. No.: 18/628,341

(22) Filed: Apr. 5, 2024

(65) Prior Publication Data

US 2025/0126633 A1 Apr. 17, 2025

Related U.S. Application Data

(63) Continuation-in-part of application No. 18/484,577, filed on Oct. 11, 2023, now Pat. No. 12,621,646.

(51) Int. Cl.

*H04W 72/566* (2023.01)

*H04W 76/50* (2018.01)

(52) U.S. Cl.

CPC ......... *H04W 72/566* (2023.01); *H04W 76/50* (2018.02)

(58) Field of Classification Search

CPC ..... H04W 8/02; H04W 12/084; H04W 84/12; H04W 4/90; H04W 12/06

(Continued)

(56) References Cited

U.S. PATENT DOCUMENTS

2010/0202368 A1* 8/2010 Hans ........................ H04W 4/90 370/352

2019/0124541 A1* 4/2019 Henry ...................... H04L 12/66

(Continued)

OTHER PUBLICATIONS

Notice of allowance for corresponding U.S. Appl. No. 18/484,577; dated Feb. 5, 2026 (13 pages).

(Continued)

*Primary Examiner* — Kwang B Yao

*Assistant Examiner* — Syed M Bokhari

(74) *Attorney, Agent, or Firm* — Mendelsohn Dunleavy, P.C.; Steve Mendelsohn

(57) ABSTRACT

In certain embodiments, a clearinghouse AAA server receives, from a network AAA server of a network, a request for a priority UE to access an external data network via the network, accesses a Declared Emergency Location Registry (DELR) database to determine whether a current emergency situation has been declared for the network, determines whether the priority UE is permitted (e.g., authenticated and authorized) to access the external data network via the network, and determines whether the priority UE should receive priority or non-priority access to the external data network via the network. Depending on the situation, the network may be the UE's home network or a visited network having a roaming agreement with the home network. In this way, priority UEs can receive priority access to external data networks via networks during declared emergency situations.

18 Claims, 12 Drawing Sheets

(58) Field of Classification Search
USPC ........................................... 370/329; 379/329
See application file for complete search history.

(56) References Cited

U.S. PATENT DOCUMENTS

| | | | | |
|---|---|---|---|---|
| 2020/0145465 | A1* | 5/2020 | Al-Mehdar | H04L 65/1016 |
| 2022/0159535 | A1* | 5/2022 | Rahman | H04L 9/0643 |
| 2025/0031277 | A1* | 1/2025 | Gundavelli | H04W 72/563 |

OTHER PUBLICATIONS

Non Final Office action for corresponding U.S. Appl. No. 18/484,577; dated Oct. 21, 2025 (60 pages).
Notice of allowance for corresponding U.S. Appl. No. 18/484,577; dated Mar. 6, 2026 (10 pages).

* cited by examiner

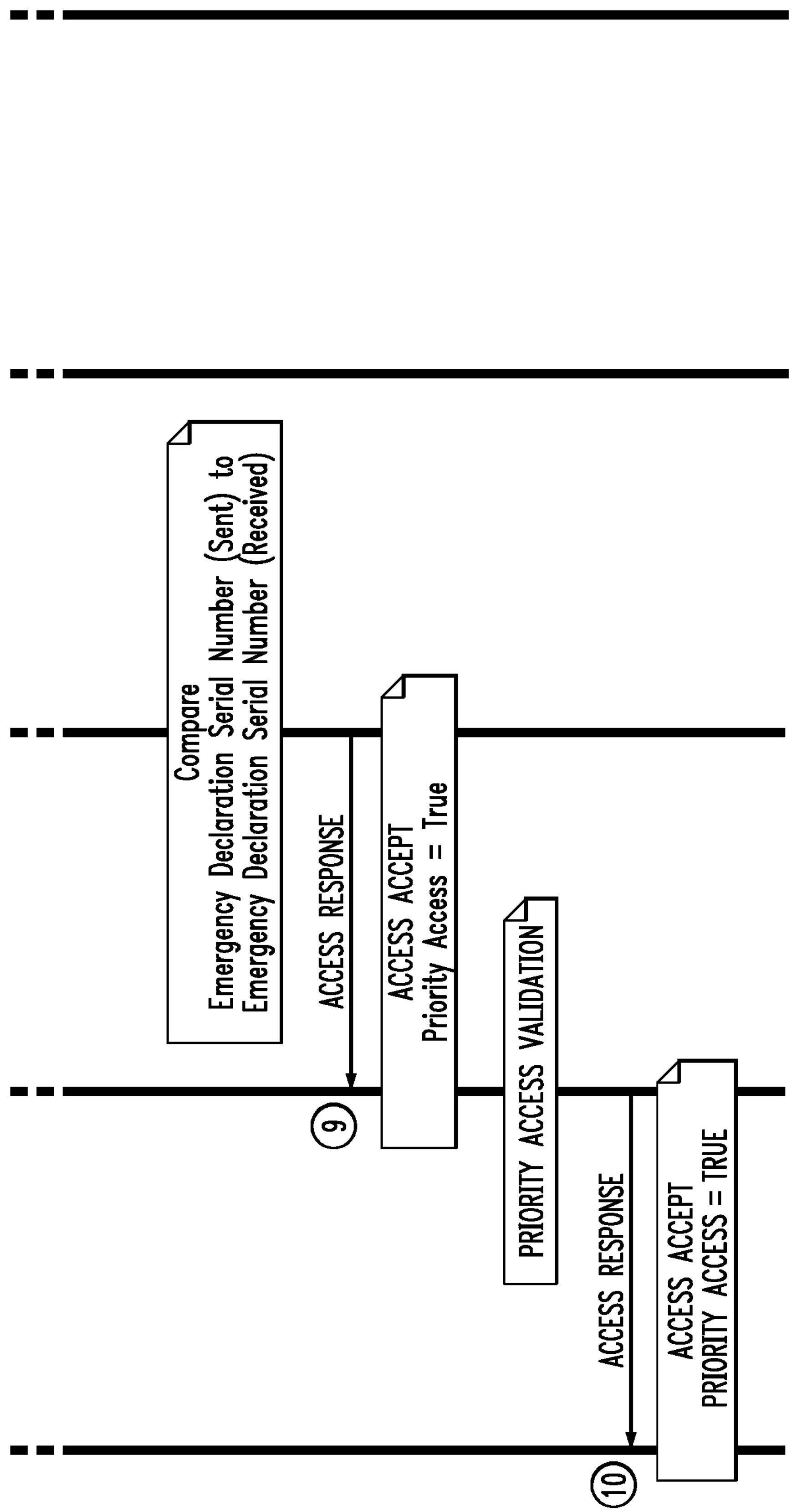
*FIG. 3 cont. (1)*

PRIORITY INTERNET ACCESS VIA NETWORKS DURING EMERGENCY SITUATIONS

CROSS-REFERENCE TO RELATED APPLICATIONS

This is a continuation-in-part of co-pending application Ser. No. 18/484,577, filed on Oct. 11, 2023, the teachings of which are incorporated herein by reference in their entirety.

BACKGROUND

Field of the Disclosure

The present disclosure relates to a device, such as a cell phone, accessing an external network, such as the Internet, via a WiFi network.

Description of the Related Art

This section introduces aspects that may help facilitate a better understanding of the disclosure. Accordingly, the statements of this section are to be read in this light and are not to be understood as admissions about what is prior art or what is not prior art.

It is known for a wireless device, such as a cell phone, to be able to access an external data network, such as the Internet, via a wireless WiFi local area network (LAN). It is also known for different WiFi networks to have roaming agreements that enable a user who subscribes to (aka is registered with) one WiFi network to have access to an external data network via another WiFi network to which the user is not subscribed.

FIG. 1 is a simplified block diagram representing a prior-art situation in which the wireless device (i.e., user equipment or UE, for short) 110 of a user who subscribes to a so-called "home" WiFi network is currently located outside of the coverage area of the home WiFi network, but within the coverage area of a so-called "visited" WiFi network to which the user is not a subscriber but which has a roaming agreement with the home WiFi network.

According to the prior art, when the user wants to use the UE 110 of FIG. 1 to access an external data network (not shown), such as the Internet, via the visited WiFi network, the UE 110 will communicate with the visited WiFi network's authentication, authorizing, and accounting (AAA) server 120, which will then communicate directly with the home WiFi network's AAA server 130 to authenticate the UE 110 and confirm that the UE 110 is authorized to receive the user's requested external data network access via the visited WiFi network. If the home AAA server 130 authenticates and authorizes the UE 110, then the visited AAA server 120 will provide the UE 110 with the requested external data network access via the visited WiFi network.

As represented in FIG. 1, in Step 1, the UE 110 transmits to the visited AAA server 120 a wireless message containing the user's request for external data network access. Depending on the particular implementation, this message identifies one or more of the user, the UE 110, and the home WiFi network.

After determining that (i) the user and/or the UE 110 subscribes to the home WiFi network and (ii) the visited WiFi network has a roaming agreement with the home WiFi network, in Step 2, the visited AAA server 120 transmits to the home AAA server 130 a (wireless, wireline, or optical, depending on the particular implementation) message containing the user's request. Depending on the particular implementation, this message identifies one or more of the user, the UE 110, and the visited WiFi network.

After (i) authenticating the user and/or the UE 110 and (ii) authorizing the UE 110 to access the external data network via the visited WiFi network, in Step 3, the home AAA server 130 transmits to the visited AAA server 120 a message containing a positive response to the user's request, and, in Step 4, the visited AAA server 120 forwards that positive response to the UE 110. Although not represented in FIG. 1, the visited AAA server 120 then provides the UE 110 with access to the external data network via the visited WiFi network.

Note that, if the home AAA server 130 fails to authenticate and authorize the UE 110, then, in Step 3, the home AAA server 130 transmits to the visited AAA server 120 a message containing a negative response to the user's request, and, in Step 4, the visited AAA server 120 forwards that negative response to the UE 110. In that case, the visited AAA server 120 will not provide the UE 110 with access to the external data network via the visited WiFi network.

Note that simplified FIG. 1 does not explicitly show the access point (AP) of the visited WiFi network with which the UE 110 directly communicates or the backbone of the visited WiFi network by which that AP communicates with the visited AAA server 120. Nor does simplified FIG. 1 show infrastructure by which the visited and home AAA servers 120 and 130 communicate with each other. These same simplifications apply to other figures in this application.

During an emergency situation, either natural, such as (without limitation) an earthquake or hurricane, or man-made, such as (without limitation) a war or terrorist attack, it is often critical for a first responder to access an external data network via a (home or visited) WiFi network. Unfortunately, during such emergency situations, WiFi networks are often overloaded with traffic of users who are not first responders, thereby preventing adequate access by first responders to external data networks via those WiFi networks.

SUMMARY

Problems in the prior art are addressed in accordance with the principles of the present disclosure by techniques for providing first responders and other designated individuals with priority access to networks during emergency situations.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

According to certain embodiments of the present disclosure, specific users, such as first responders, and/or their UEs, are pre-registered to receive priority access to external data networks via WiFi networks during certain situations, such as emergency situations in specified geographic areas.

Figure 2:
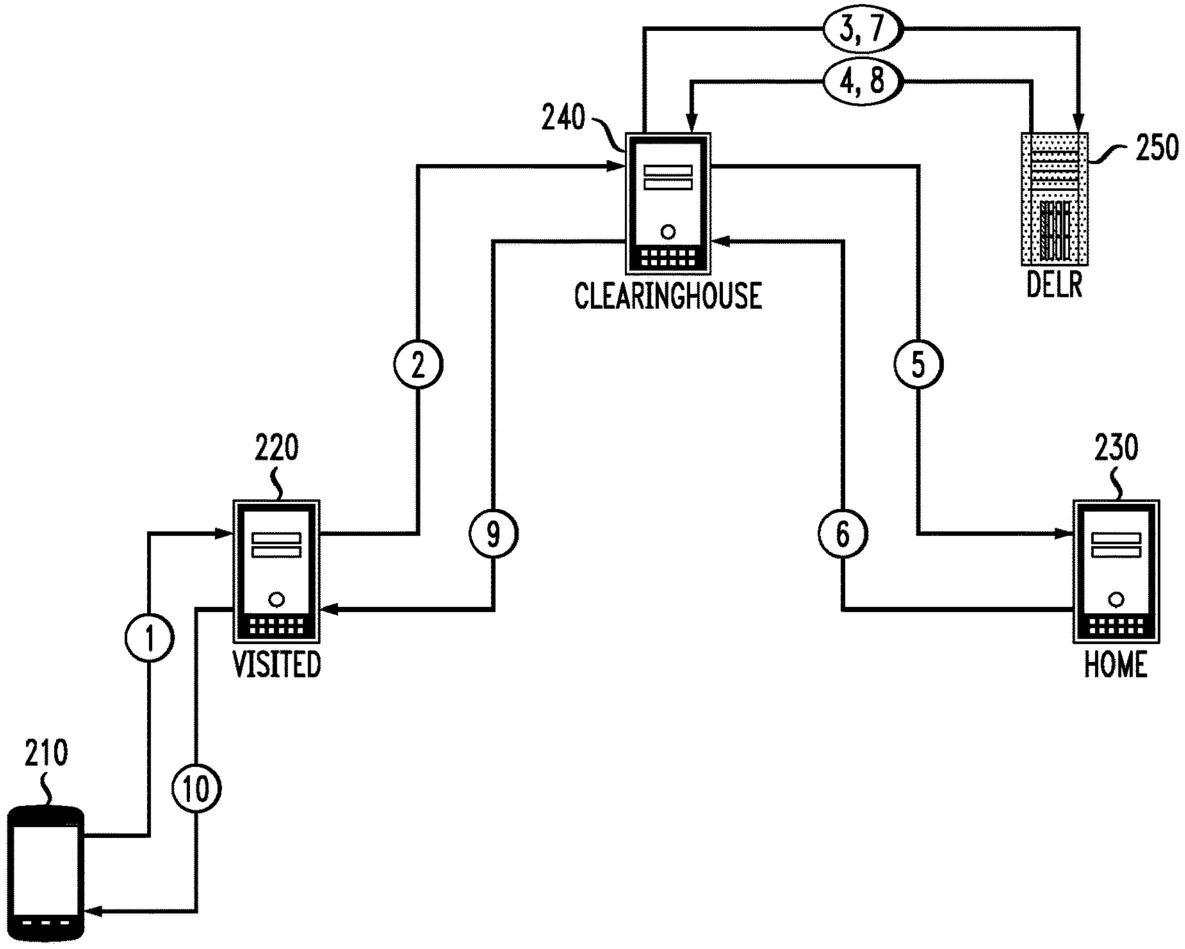
FIG. 2 is a simplified block diagram representing a particular situation of the present disclosure in which a priority wireless device (i.e., UE) is currently located outside of the coverage area of its home WiFi network, but within the coverage area of a visited WiFi network that has a roaming agreement with the home WiFi network.

FIG. 2 is a simplified block diagram representing a particular situation of the present disclosure in which the wireless device (i.e., UE) 210 of a so-called "priority" user who subscribes to a home WiFi network is currently located outside of the coverage area of the home WiFi network, but within the coverage area of a visited WiFi network to which the priority user is not a subscriber but which has a roaming agreement with the home WiFi network. In the scenario represented in FIG. 2, the visited WiFi network is located within a geographic area that has been declared to have an ongoing emergency. In that case, priority UEs, such as UE 210, will receive priority access over non-priority UEs to an external data network via the visited WiFi network.

Depending on the particular implementation and/or the particular type of emergency situation, priority access could involve a priority UE receiving more time slots and/or higher bandwidth to access the external data network than non-priority UEs receive including the possibility of exclusive access by only priority UEs during the emergency situation.

Figure 1:
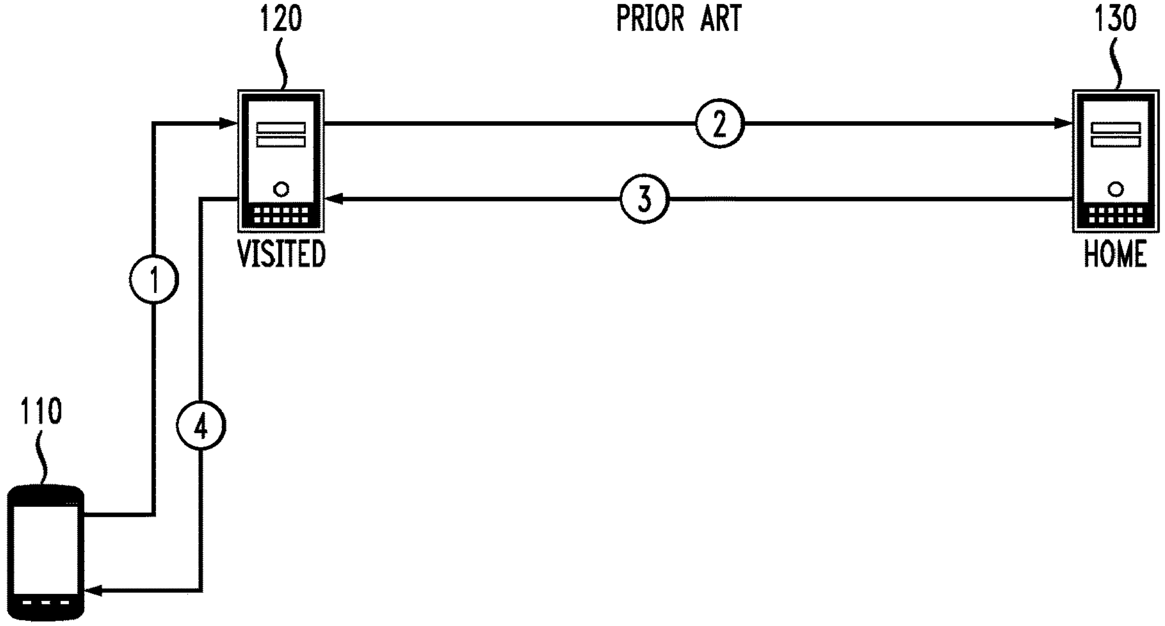
FIG. 1 PRIOR ART
FIG. 1 is a simplified block diagram representing a prior-art situation in which a wireless device is currently located outside of the coverage area of its home WiFi network, but within the coverage area of a visited WiFi network that has a roaming agreement with the home WiFi network.

In addition to the UE 210, the visited AAA server 220 of the visited WiFi network, and the home AAA server 230 of the home WiFi network, all of which are analogous to the corresponding prior-art elements in FIG. 1, FIG. 2 also includes clearinghouse AAA server 240 and Declared Emergency Location Registry (DELR) 250. DELR 250 is a database that keeps track of the geographic areas that are currently declared to have ongoing emergencies, where the DELR database 250 is administered by an entity not shown in FIG. 2. As described further below, clearinghouse AAA server 240 processes requests for access to external data networks from priority UEs.

Figure 3:
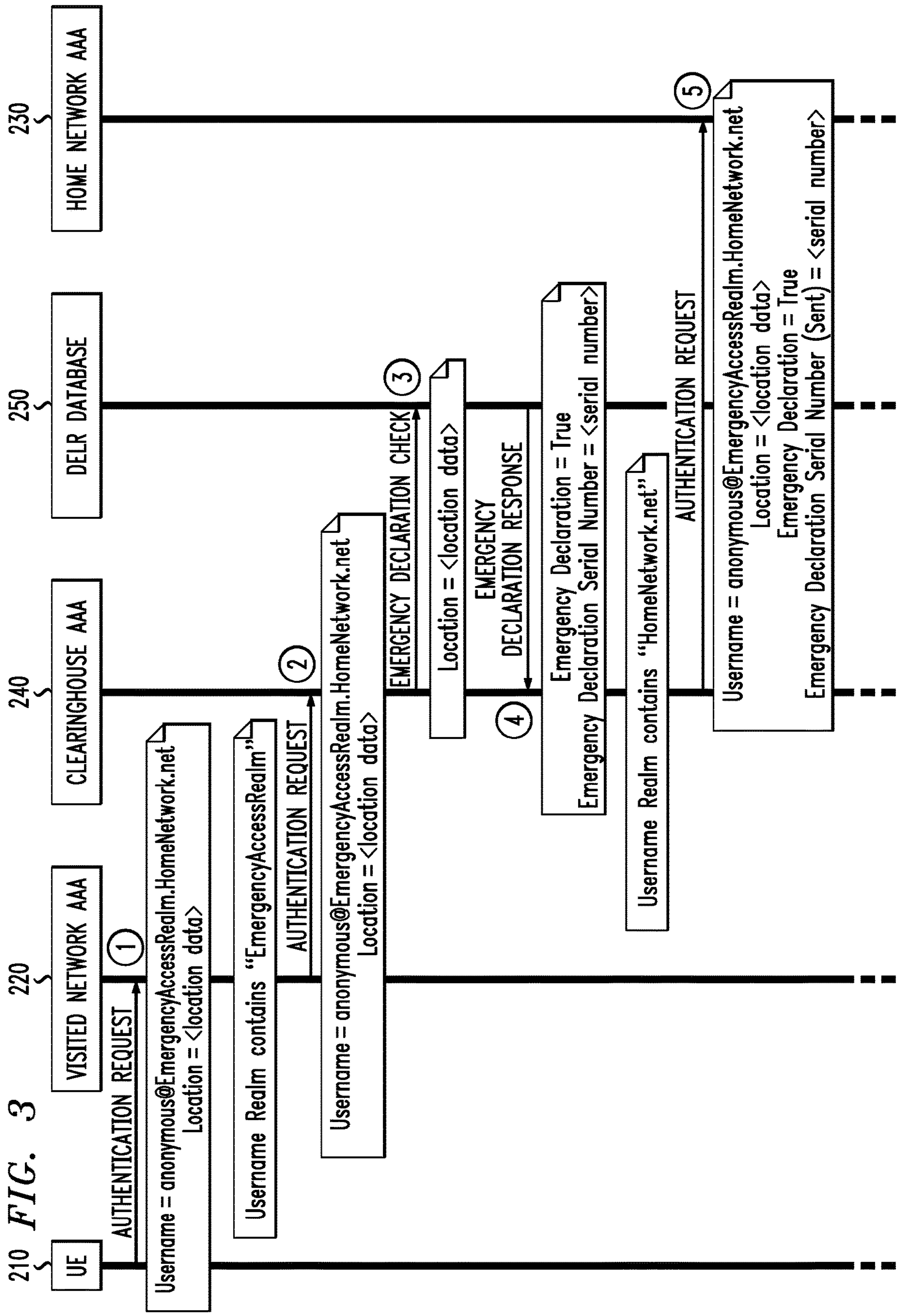
FIG. 3 is a signal flow diagram representing the flow of signals between the different nodes of FIG. 2 for a scenario in which an emergency situation has been declared in the geographic area in which the visited WiFi network exists.
Figure 3:
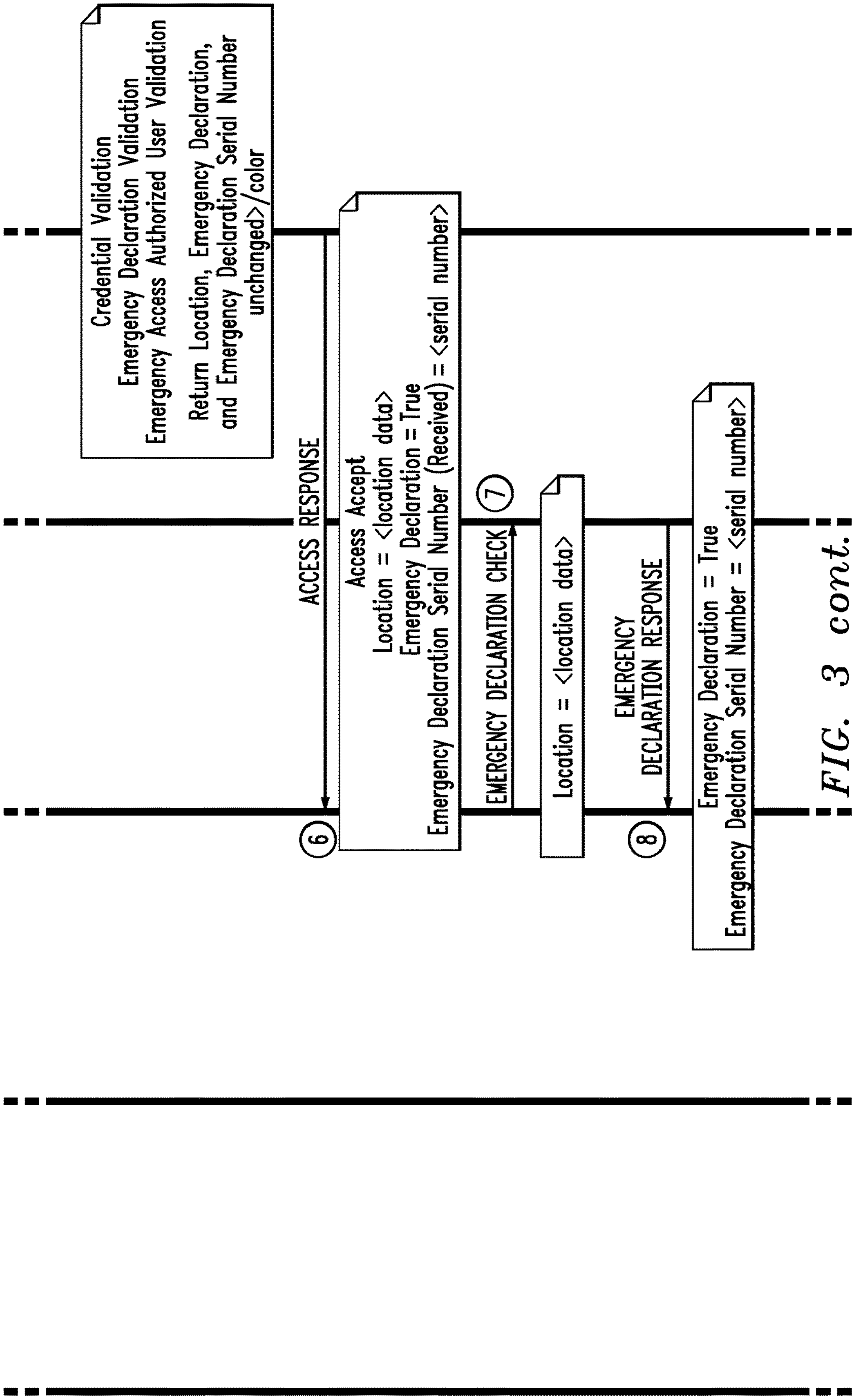

FIG. 3 is a signal flow diagram representing the flow of signals between the different nodes of FIG. 2 for a scenario in which the UE 210 is pre-registered as a priority device (i.e., a wireless device that is given priority access to certain WiFi networks during certain declared emergency situations) and such an emergency situation has been declared in the geographic area in which the visited WiFi network of FIG. 2 exists.

In one possible implementation, in Step 1 of FIGS. 2 and 3, the UE 210 transmits to the visited AAA server 220 a message requesting access to an external data network (not shown) via the visited WiFi network. The message of Step 1 identifies (i) the UE 210, (ii) the home WiFi network of the UE 210, (iii) the current location of the UE 210, and (iv) that the UE 210 is a priority device. In response, the visited AAA server 220 determines that a roaming agreement exists between the visited WiFi network and the home WiFi network. If the UE 210 were not a priority device, then the visited AAA server 220 would forward a message directly to the home AAA server 230 to authenticate and authorize the UE 210 to receive access to the external data network via the visited WiFi network, as in the prior art.

According to certain embodiments of the disclosure, because the visited AAA server 220 determines that the UE 210 is a priority device, in Step 2, the visited AAA server 220 transmits to the clearinghouse AAA server 240 a message identifying (i) the priority UE 210, (ii) the home WiFi network of the UE 210, and (iii) either the current location of the UE 210 or the location of the visited WiFi network, depending on the particular implementation. In the following description, it is assumed that the message identifies the location of the visited WiFi network. Note that the location of the visited AAA server 220 may be different from the location of the visited WiFi network.

In Step 3, the clearinghouse AAA server 240 transmits to the DELR database 250 a query identifying the location of the visited WiFi network to determine whether the visited WiFi network is located in a geographic area that has been declared to have an ongoing emergency situation. In response, in Step 4, the DELR database 250 transmits to the clearinghouse AAA server 240 a response containing (i) a positive logical flag indicating that a current emergency situation has been declared for the geographic area of the visited WiFi network exists and (ii) a unique serial number assigned for that particular current emergency situation. Depending on the implementation, if that geographic area has no current emergency situation, then the response may contain a negative logical flag and/or a pre-defined default serial number, such as 0, indicating that no current emergency situation exists.

In Step 5, the clearinghouse AAA server 240 transmits to the home AAA server 230 a message with the priority UE's external data network request identifying (i) the priority UE 210, (ii) the visited WiFi network, (iii) the location of the visited WiFi network, and (iv) the serial number for the emergency situation that the clearinghouse AAA server 240 received from the DELR database 250. In response, the home AAA server 230 (i) determines that the home WiFi network has a roaming agreement with the visited WiFi network and (ii) authenticates and authorizes the UE 210 to access the external data network via the visited WiFi network during the identified emergency situation.

In Step 6, the home AAA server 230 transmits a message back to the clearinghouse AAA server 240 informing the clearinghouse AAA server 240 that the UE 210 is authenticated and authorized for priority access during an emergency situation. In addition, that message includes the location data and the serial number for the emergency situation that the home AAA server 230 received from the clearinghouse AAA server 240 in Step 5.

In Steps 7 and 8, the clearinghouse AAA server 240 uses the location data and the serial number received from the home AAA server 230 to confirm that the serial number represents a legitimate emergency situation by querying the DELR database 250. In particular, in Step 7, the clearinghouse AAA server 240 uses the location data to access the DELR database 250 to determine whether that location has an existing emergency situation, and, in Step 8, the DELR database 250 returns the serial number for the emergency situation indicating that an emergency situation does exist. The clearinghouse AAA server 240 can then compare the serial number received from the home AAA server 230 to the serial number just retrieved from the DELR database 250 to confirm the existence of the emergency situation. This prevents the home AAA server 230 from creating an invalid location/serial number combination to provide their users with priority access when an emergency is not declared.

In Step 9, the clearinghouse AAA server 240 transmits to the visited AAA server 220 a positive message confirming that the UE 210 is authenticated and authorized as a priority device during an emergency situation, and, in Step 10, the visited AAA server 220 forwards that positive message to the UE 210. Although not represented in FIGS. 2 and 3, the visited AAA server 220 will then provide the UE 210 with priority access (relative to non-priority devices) to the external data network via the visited WiFi network during the emergency situation.

Figure 4:
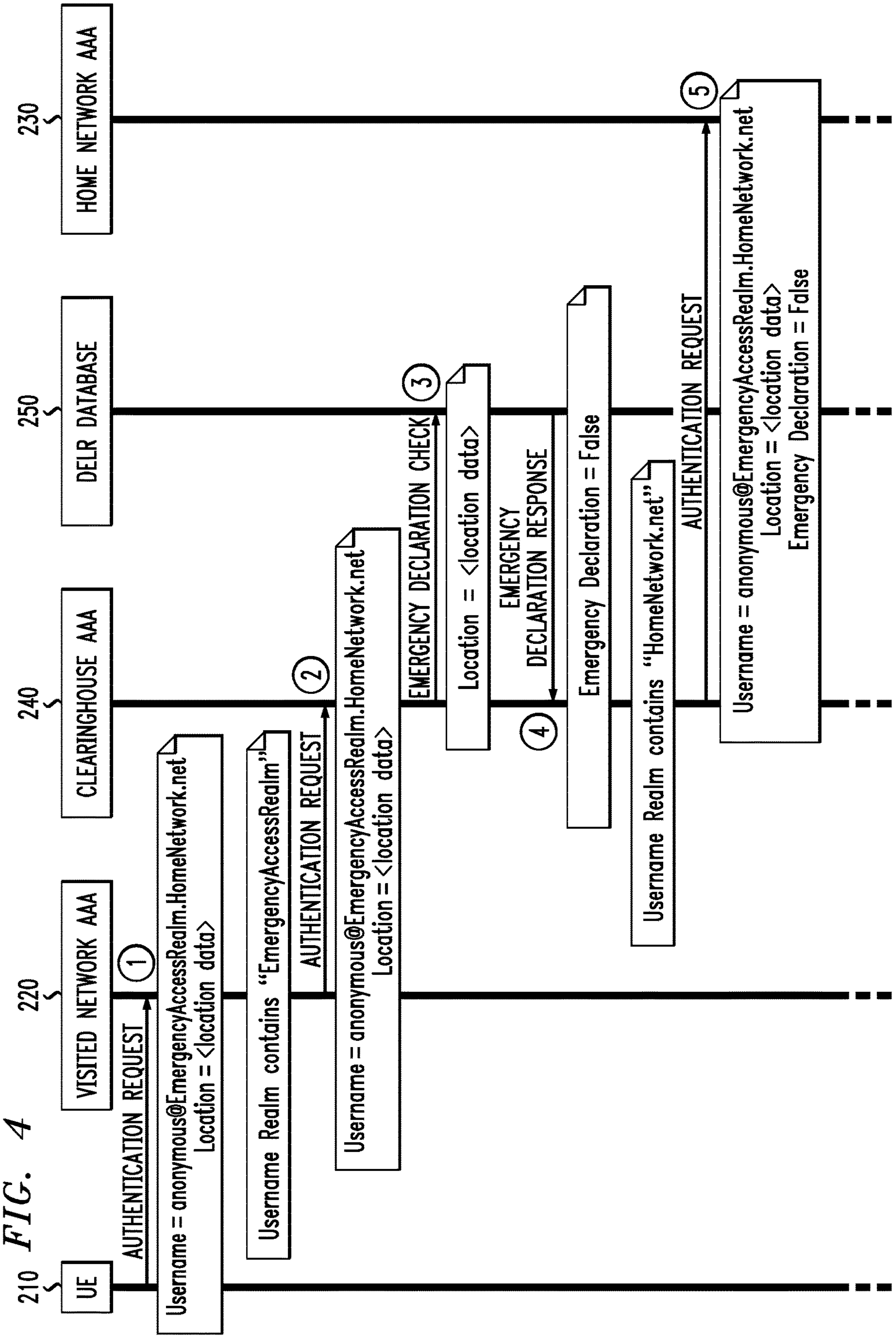
FIG. 4 is a signal flow diagram representing the flow of signals between the different nodes of FIG. 2 for a scenario in which an emergency situation has not been declared in the geographic area in which the visited WiFi network exists.
Figure 4:
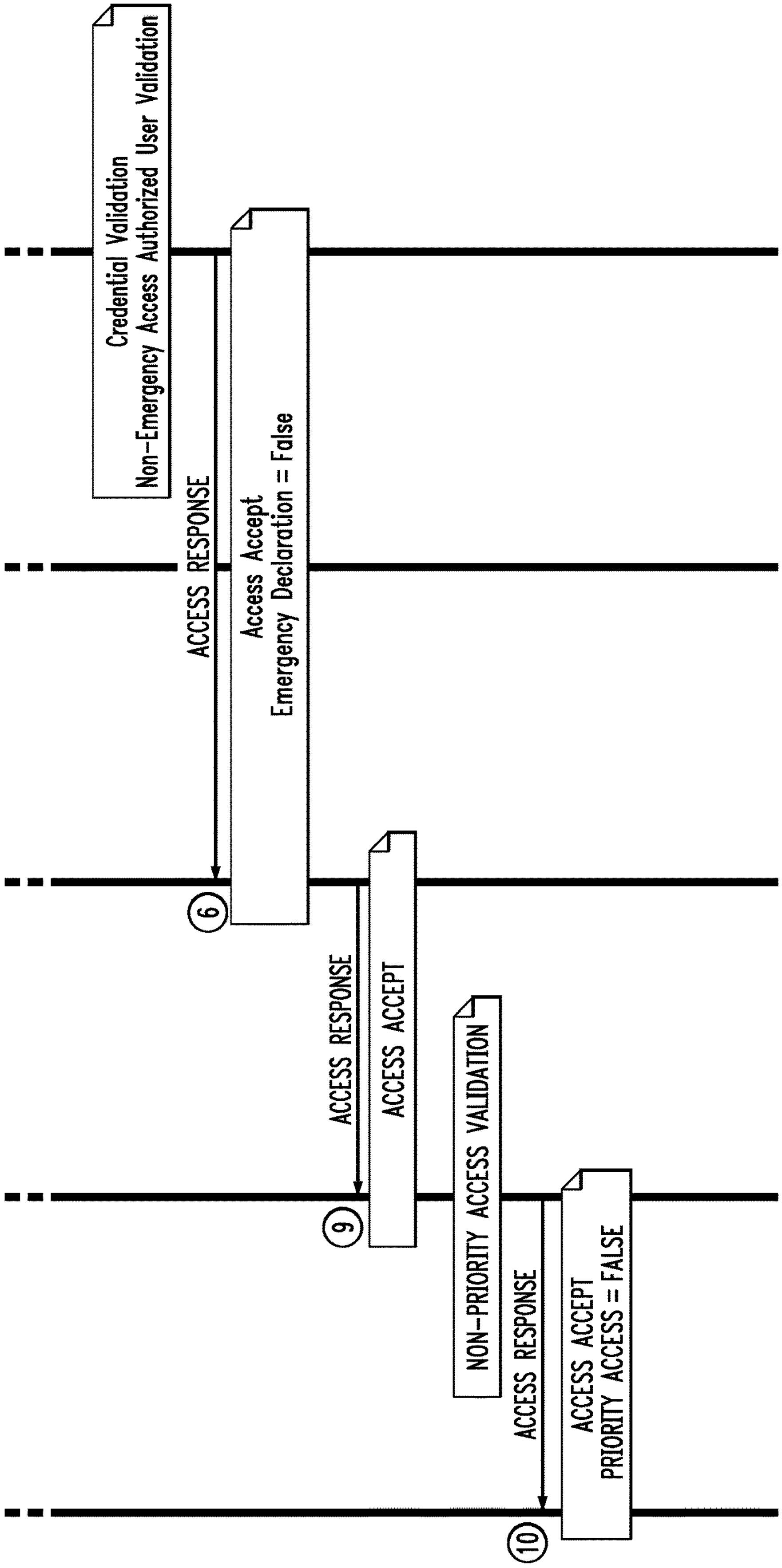

FIG. 4 is a signal flow diagram representing the flow of signals between the different nodes of FIG. 2 for a scenario in which the UE 210 is pre-registered as a priority device but where an emergency situation has not been declared in the geographic area in which the visited WiFi network of FIG. 2 exists.

Steps 1-3 of FIG. 4 are the same as Steps 1-3 of FIG. 3. In Step 4 of FIG. 4, the DELR database 250 transmits to the clearinghouse AAA server 240 a response containing a negative logical flag indicating that a current emergency situation has not been declared for the geographic area of the visited WiFi network exists.

In Step 5, the clearinghouse AAA server 240 transmits to the home AAA server 230 a message with the priority UE's external data network request identifying (i) the priority UE 210, (ii) the visited WiFi network, (iii) the location of the visited WiFi network, and (iv) that there is no emergency situation in the geographic area of the visited WiFi network. In response, the home AAA server 230 (i) determines that the home WiFi network has a roaming agreement with the visited WiFi network and (ii) authenticates and authorizes the UE 210 to access the external data network via the visited WiFi network during the non-emergency situation.

In Step 6, the home AAA server 230 transmits a message back to the clearinghouse AAA server 240 informing the clearinghouse AAA server 240 that the UE 210 is authenticated and authorized for access during a non-emergency situation. Because there is no emergency situation, Steps 7 and 8 of FIG. 3 are omitted.

In Step 9, the clearinghouse AAA server 240 transmits to the visited AAA server 220 a positive message confirming that the UE 210 is authenticated and authorized for access during a non-emergency situation, and, in Step 10, the visited AAA server 220 forwards that positive message to the UE 210. Although not represented in FIGS. 2 and 3, the visited AAA server 220 will then provide the UE 210 with non-priority access to the external data network via the visited WiFi network during the non-emergency situation.

Figure 5:
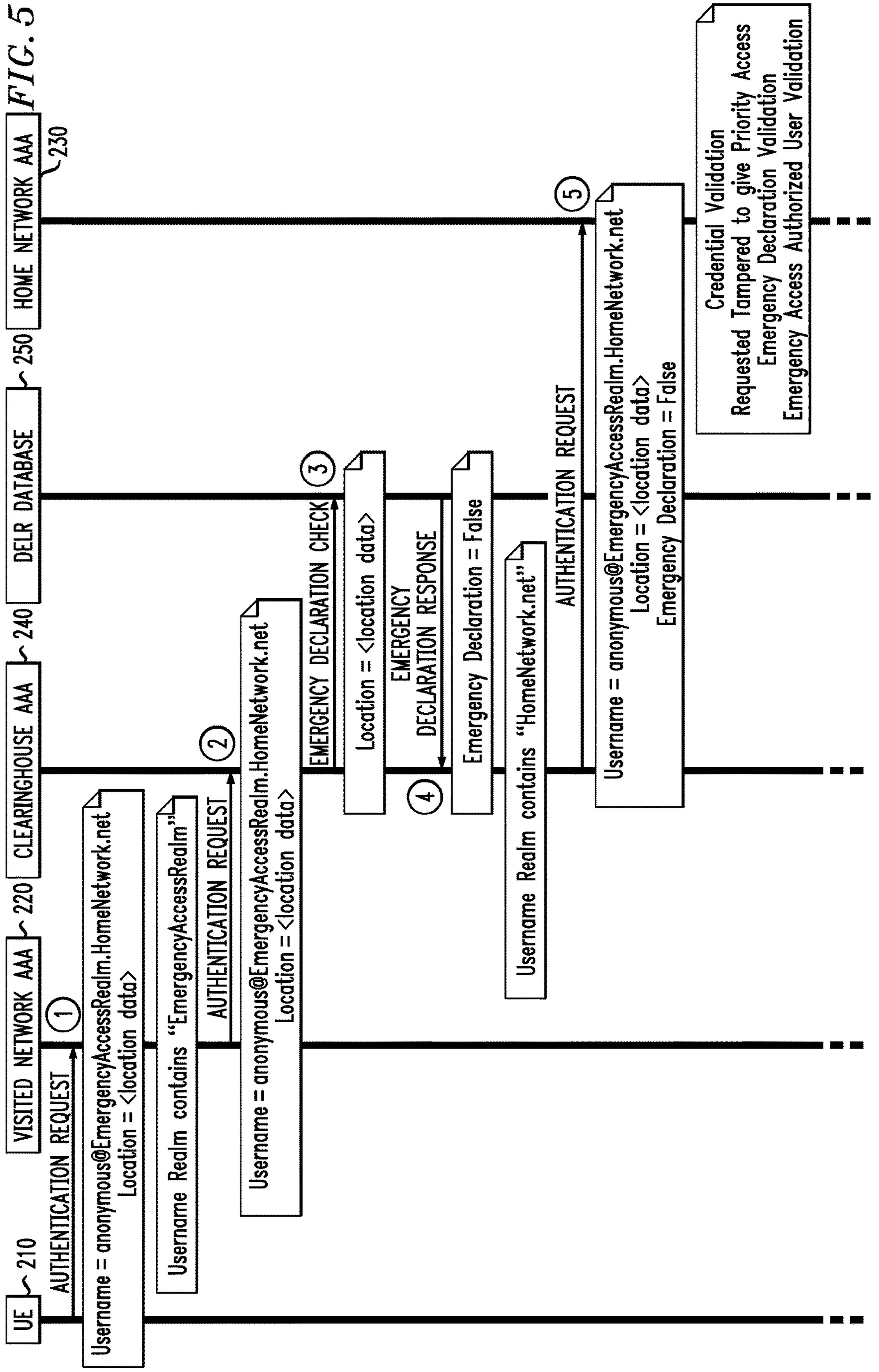
FIG. 5 is a signal flow diagram representing the flow of signals between the different nodes of FIG. 2 for a scenario in which no emergency situation has been declared in the geographic area in which the visited WiFi network exists, but where the home AAA server nevertheless attempts to secure priority access for the priority UE.
Figure 5:
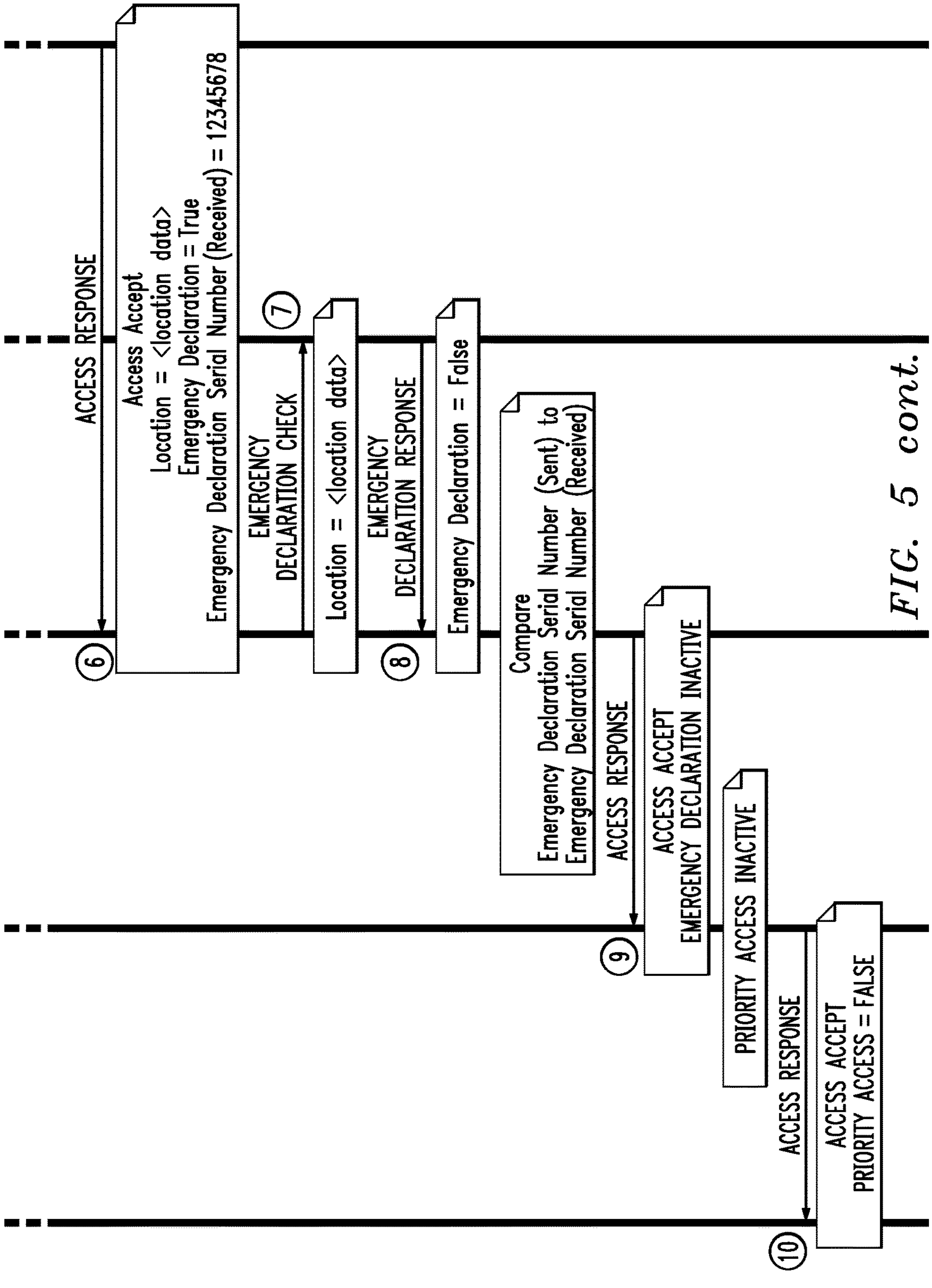

FIG. 5 is a signal flow diagram representing the flow of signals between the different nodes of FIG. 2 for a scenario in which the UE 210 is pre-registered as a priority device and no emergency situation has been declared in the geographic area in which the visited WiFi network of FIG. 2 exists (as in the situation of FIG. 4), but where the home AAA server 230 nevertheless attempts to secure priority access for the priority UE 210.

Steps 1-5 of FIG. 5 are identical to Steps 1-5 of FIG. 4. Instead of transmitting a message indicating that the UE 210 is authenticated and authorized for non-priority access during the current non-emergency situation (as in Step 6 of FIG. 4), in Step 6 of FIG. 5, the home AAA server 230 attempts to secure priority access for the UE 210 by transmitting to the clearinghouse AAA server 240 an access response message with a positive logical flag and a non-zero serial number.

Because the logical flag is positive, in Step 7, the clearinghouse AAA server 240 uses the serial number received from the home AAA server 230 to query the DELR database 250 about the corresponding emergency situation. If that serial number does not exist, then, in Step 8, the DELR database 250 sends to the clearinghouse AAA server 240 a message indicating that no such emergency situation exists.

In Step 9, the clearinghouse AAA server 240 transmits to the visited AAA server 220 a positive message confirming that the UE 210 is authenticated and authorized for access during a non-emergency situation, and, in Step 10, the visited AAA server 220 forwards that positive message to the UE 210. Although not represented in FIGS. 2 and 3, the visited AAA server 220 will then provide the UE 210 with non-priority access to the external data network via the visited WiFi network during the non-emergency situation, thereby thwarting the attempt by the home AAA server 230 to secure priority access for the UE 210.

Note that, in some implementations, if the UE 210 is a non-priority device, then the visited AAA server 220 will transmit the UE's request for external data network access directly to the home AAA server 230, which will determine authentication and authorization of the UE 210 and respond directly to the visited AAA server 220, as in the prior art.

In other possible implementations, all requests for external data network access are forwarded by the visited AAA server 220 to the clearinghouse AAA server 240, whether the UE 210 is a priority UE or a non-priority UE. In such an implementation, the clearinghouse AAA server 240 will access the DELR location registry 250 preferably only for requests from priority UEs. Otherwise, the processing would be the same as the previously described implementation.

Figure 6:
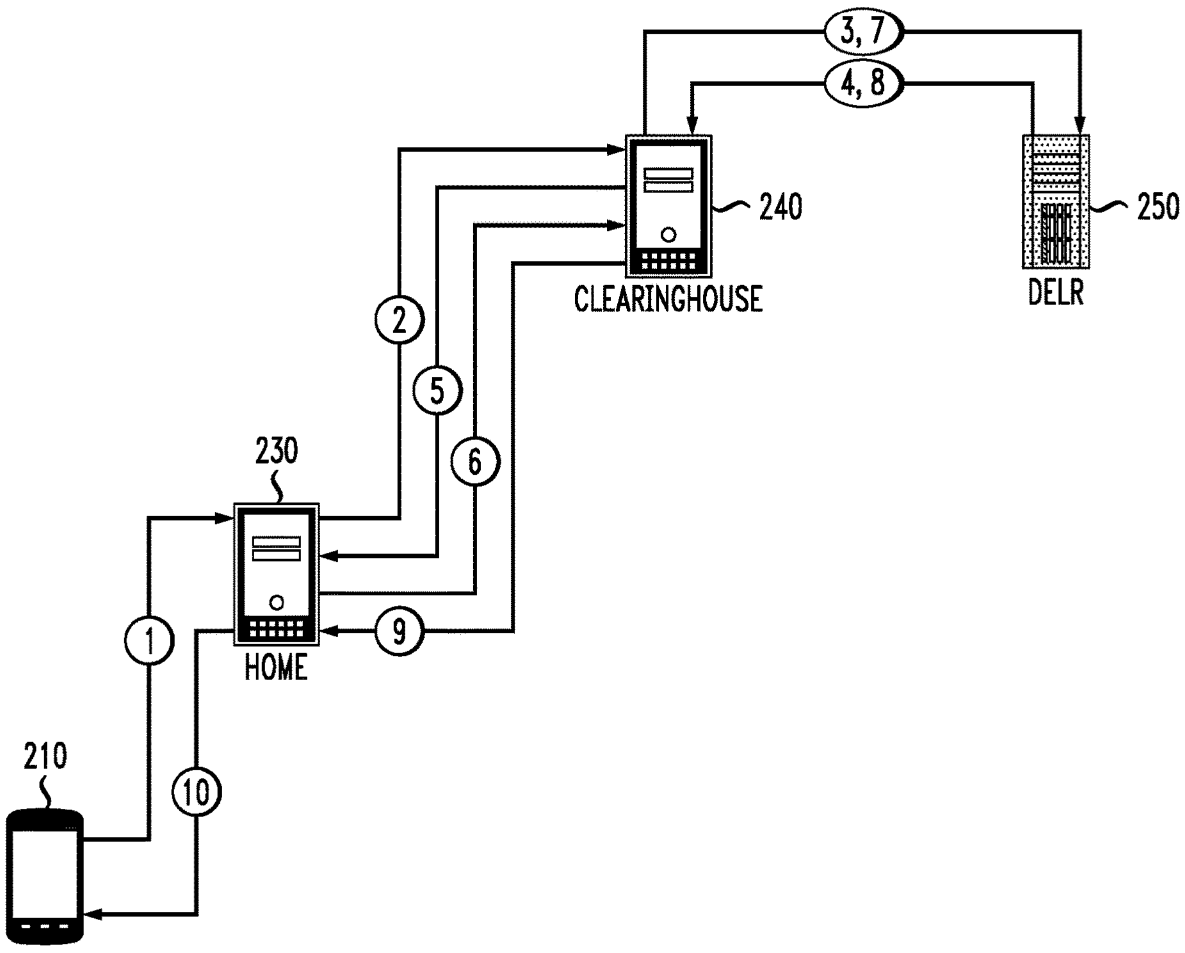
FIG. 6 is a simplified block diagram representing a particular situation of the present disclosure in which the priority UE is currently located within the coverage area of its home WiFi network, where the home WiFi network is located within a geographic area that has been declared to have an ongoing emergency.

FIG. 6 is a simplified block diagram representing a particular situation of the present disclosure in which the priority UE 210 is currently located within the coverage area of its home WiFi network, where the home WiFi network is located within a geographic area that has been declared to have an ongoing emergency. In that case, priority UEs, such as UE 210, will receive priority access over non-priority UEs to an external data network via the home WiFi network.

Figure 7:
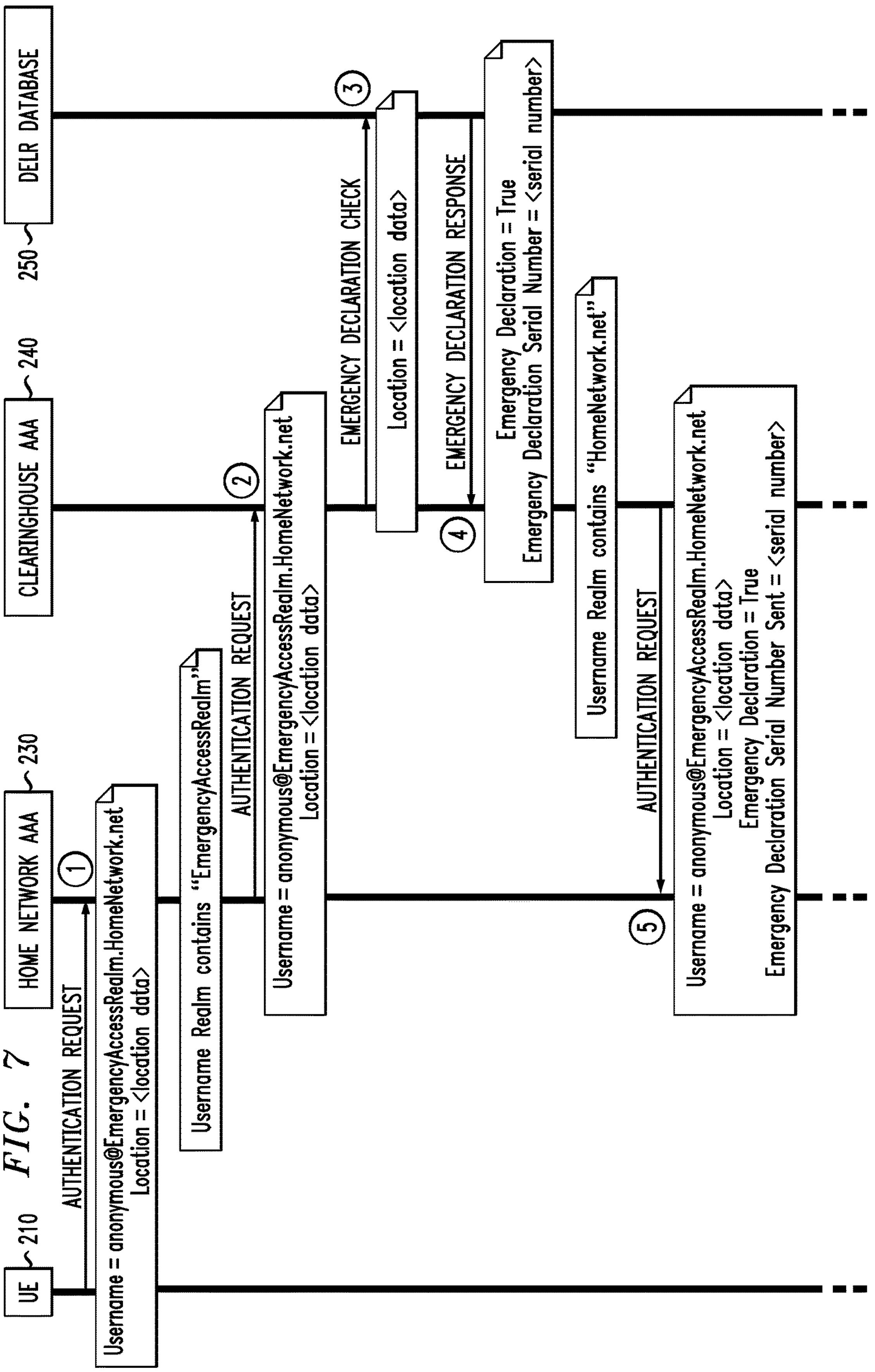
FIG. 7 is a signal flow diagram representing the flow of signals between the different nodes of FIG. 6 for a scenario in which an emergency situation has been declared in the geographic area in which the home WiFi network exists.
Figure 7:
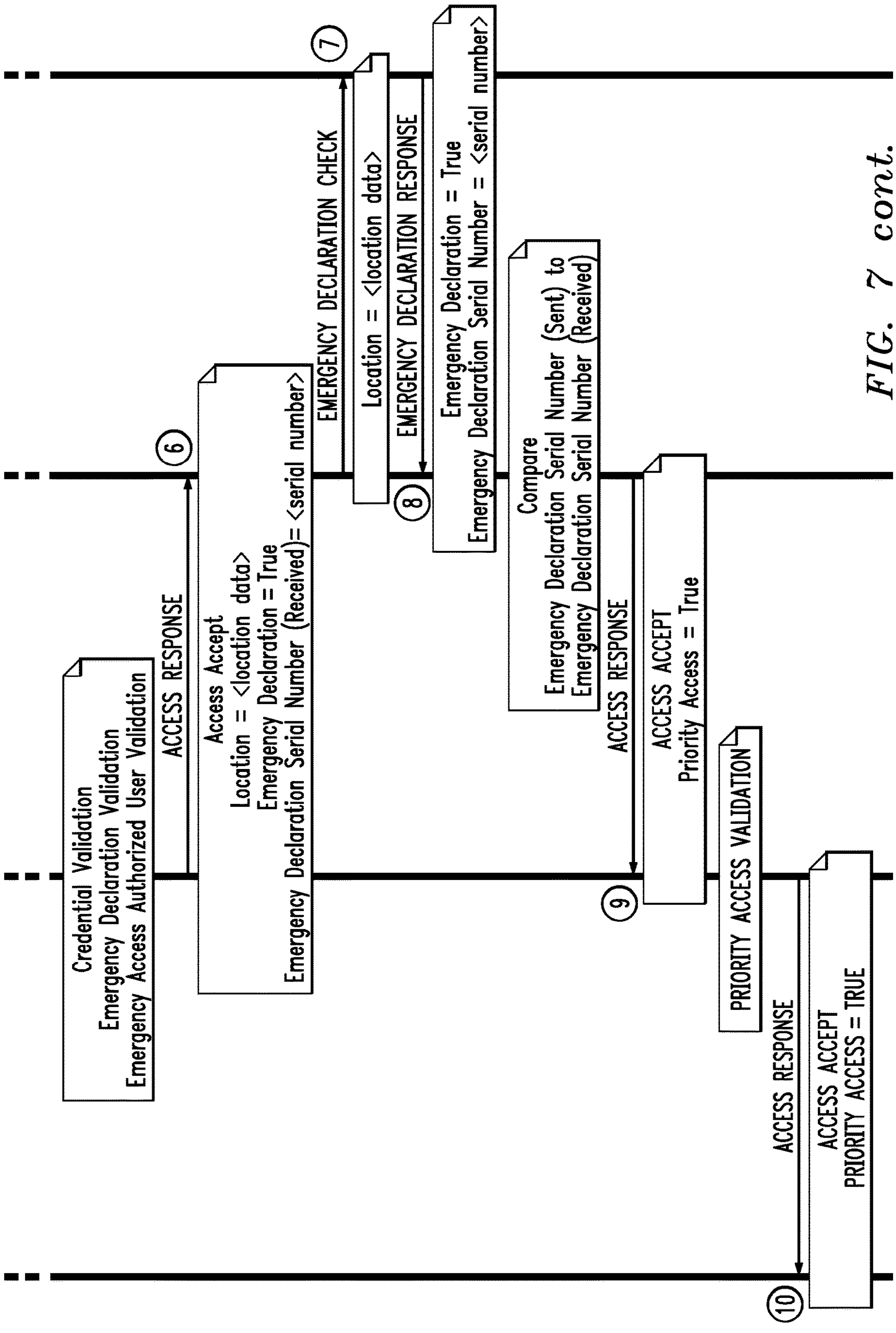

FIG. 7 is a signal flow diagram representing the flow of signals between the different nodes of FIG. 6 for a scenario in which an emergency situation has been declared in the geographic area in which the home WiFi network of FIG. 6 exists.

Steps 1-10 of FIGS. 6 and 7 are analogous to Steps 1-10 of FIGS. 2 and 3, where all of the steps involving the visited AAA server 220 of FIGS. 2 and 3 are replaced by steps involving the home AAA server 230.

Although not shown in the figures, those skilled in the art will understand that a signal flow diagram analogous to FIG. 4 applies to a corresponding situation in which the priority UE 210 is located within the coverage area of its home WiFi network during a non-emergency situation. Similarly, those skilled in the art will understand that a signal flow diagram analogous to FIG. 5 applies to thwart the home AAA server 230 attempting to secure priority access to the priority UE 210 during a non-emergency situation where the priority UE 210 is located within the coverage area of its home WiFi network.

Figure 8:
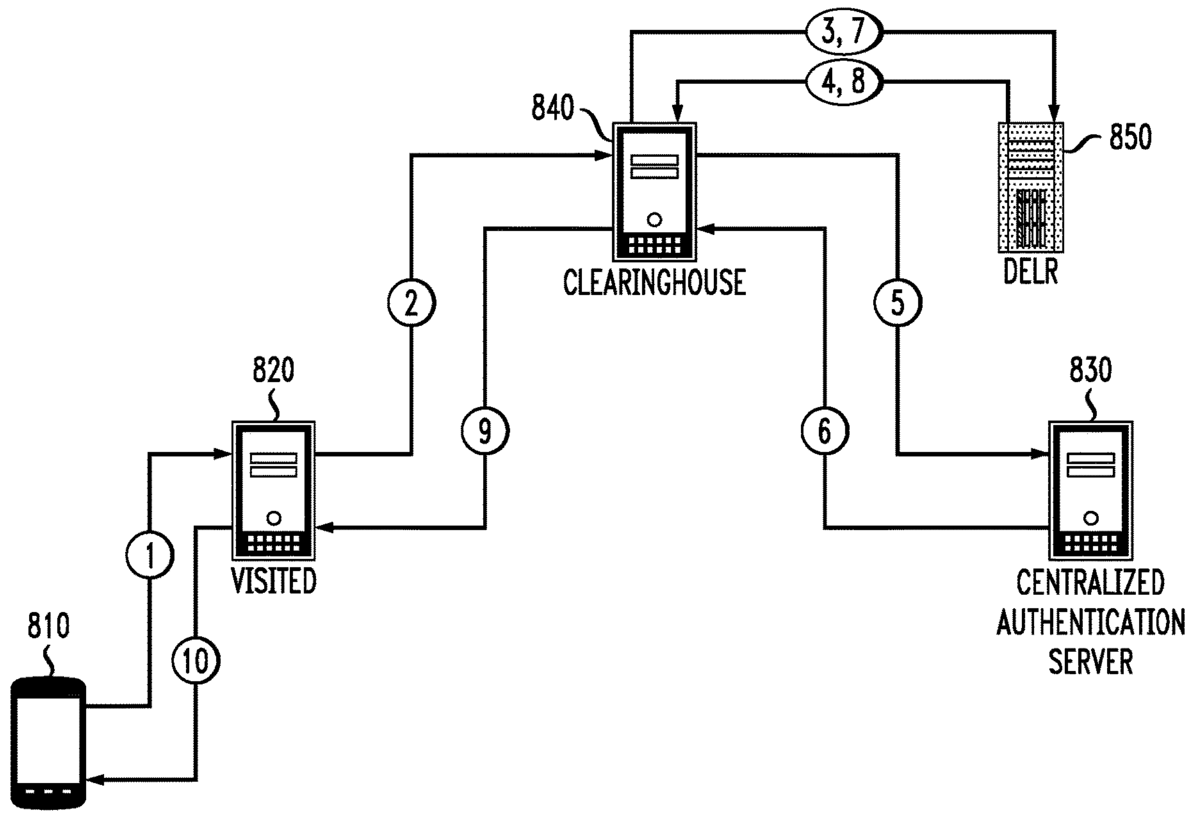
FIG. 8 is a simplified block diagram representing another particular situation of the present disclosure in which a priority UE is currently located outside of the coverage area of its home WiFi network, but within the coverage area of a visited WiFi network that has a roaming agreement with the home WiFi network.

FIG. 8 is a simplified block diagram representing another particular situation of the present disclosure in which the UE 810 of a priority user who subscribes to a home WiFi network is currently located outside of the coverage area of the home WiFi network, but within the coverage area of a visited WiFi network to which the priority user is not a subscriber but which has a roaming agreement with the home WiFi network. In the scenario represented in FIG. 8, the visited WiFi network is located within a geographic area that has been declared to have an ongoing emergency. In that case, priority UEs, such as UE 810, will receive priority access over non-priority UEs to an external data network via the visited WiFi network.

In addition to the UE 810, the visited AAA server 820 of the visited WiFi network, the clearinghouse AAA server 840, and DELR 850, all of which are analogous to the corresponding elements in FIG. 2, FIG. 8 includes a centralized authentication server 830 instead of the home AAA server 230 of the home WiFi network of FIG. 2. In this embodiment, the centralized authentication server 830 can function as the authentication server for all priority users during emergency situations. In particular, when the clearinghouse AAA server 840 receives a request for access to a visited WiFi network from a priority user's UE, such as from UE 810 via visited AAA server 820, during an emergency situation at the visited WiFi network's location, the clearinghouse AAA server 840 forwards the request to the centralized authentication server 830 for authentication and approval rather than forwarding the request to the home AAA server 230 of UE's home network as in FIG. 2.

The sequence of steps shown in FIG. 8 are analogous with the corresponding steps shown in FIG. 2. In particular, Steps 1-4 and 7-10 of FIG. 8 are identical to respective Steps 1-4 and 7-10 of FIG. 2. Steps 5 and 6 of FIG. 8 are analogous to respective Steps 5 and 6 of FIG. 2, except for the substitution of the centralized authentication server 830 of FIG. 8 for the home AAA server 230 of FIG. 2. Furthermore, the signal flow diagram of FIG. 3 applies to the scenario of FIG. 8 with the centralized authentication server 830 of FIG. 8 being substituted for the home AAA server 230 of FIG. 2 in Steps 5 and 6.

Note that, if the clearinghouse AAA server 840 determines that there is no emergency situation at the visited WiFi network's location, then the processing is the same as that shown in FIGS. 2 and 4 with the request being forwarded to the UE's home AAA server.

Note further that processing analogous to that shown in FIG. 8 would apply to a scenario in which a priority user's UE 810 is located within its own home WiFi network during an emergency situation at that location. In that case, the only difference is that the user's home AAA server would replace the visited AAA server 820 in FIG. 8, but messaging analogous to Steps 1-10 would still apply.

Figure 9:
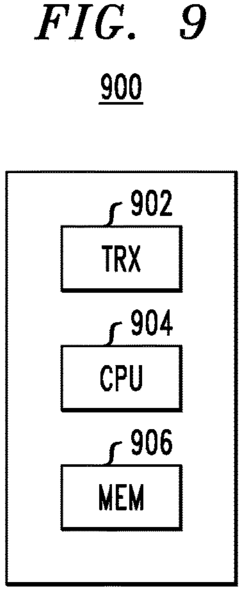
FIG. 9 is a simplified hardware block diagram of an example node that can be used to implement any of the nodes of FIGS. 2-8.

FIG. 9 is a simplified hardware block diagram of an example node 900 that can be used to implement any of the nodes of FIGS. 2-8. As shown in FIG. 9, the node 900 includes (i) communication hardware (e.g., wireless, wireline, and/or optical transceivers (TRX)) 902 that supports communications with other nodes, (ii) a processor (e.g., CPU microprocessor) 904 that controls the operations of the node 900, and (iii) a memory (e.g., RAM, ROM) 906 that stores code executed by the processor 904 and/or data generated and/or received by the node 900.

Embodiments have been described in which the clearinghouse AAA server 240/840 approves the priority UE 210/810 to receive non-priority access to the external data network via the (visiting or home) WiFi network, upon determining that (i) the priority UE 210/810 is authenticated and authorized and (ii) a current emergency situation has not been declared for the (visiting or home) WiFi network. In other embodiments, upon a similar determination, the clearinghouse server 240/840 denies access by the priority UE 210/810 to the external data network via the (visiting or home) WiFi network.

Embodiments have been described in which the clearinghouse AAA server 240/840 accesses the DELR database 250/850 to determine whether a current emergency situation has been declared for the WiFi network. In other embodiments, other techniques are employed for notifying the clearinghouse AAA server 240/840 about emergency situations that do not involve the clearinghouse AAA server 240/840 accessing a database.

Although the technology has been described in the context of WiFi networks, those skilled in the art will understand that the technology can also be implemented in the context of other types of wireless networks as well as wired networks.

In certain embodiments of the present disclosure, a clearinghouse server (1) receives, from a network server of a network, a request for a priority user equipment (UE) to access an external data network via the network; (2) determines whether a current emergency situation has been declared for the network; and (3) determines whether the priority UE is able to access the external data network via the network. Upon determining that (i) the priority UE is able to access the external data network via the network and (ii) a current emergency situation has been declared for the network, the clearinghouse server approves the priority UE to receive priority access to the external data network via the network.

In at least some of the above embodiments, the network is a visited network having a roaming agreement with a home network of the priority UE, and the clearinghouse server is configured to (a) receive the request for the priority UE to access the external data network via the visited network from a visited network server of the visited network; (b) communicate with (i) a home network server of the home network or (ii) a centralized authentication server to determine whether the priority UE is able to access the external data network via the visited network; and (c) transmit, to the visited network server, approval for the priority UE to receive access to the external data network via the visited network.

In at least some of the above embodiments, the clearinghouse server is configured to (i) receive a clearinghouse serial number for the current emergency situation; (ii) receive a home serial number for the current emergency situation from the home network server or the centralized authentication server; and (iii) compare the home serial number to the clearinghouse serial number to confirm whether the priority UE should receive priority access to the external data network via the visited network.

In at least some of the above embodiments, the network is a home network of the priority UE, and the clearinghouse server is configured to (a) receive the request for the priority UE to access the external data network via the home network from a home network server of the home network; (b) communicate with (i) the home network server or (ii) a centralized authentication server to determine whether the priority UE is permitted to access the external data network via the home network; and (c) transmit, to the home network server, approval for the priority UE to receive access to the external data network via the home network.

In at least some of the above embodiments, the clearinghouse server is configured to (i) receive a clearinghouse serial number for the current emergency situation; (ii) receive a home serial number for the current emergency situation from the home network server or the centralized authentication server; and (iii) compare the home serial number to the clearinghouse serial number to confirm whether the priority UE should receive priority access to the external data network via the home network.

In at least some of the above embodiments, the clearinghouse server is configured to (a) receive location information associated with the priority UE and/or the network; and (b) access a database to determine whether a current emergency situation has been declared for the network based on the location information.

In at least some of the above embodiments, the clearinghouse server is further configured to (i) receive, from the network server of the network, a request for a non-priority UE to access the external data network via the network; (ii) determine whether the non-priority UE is permitted to access the external data network via the network without accessing a database; and (iii) upon determining that the non-priority UE is permitted to access the external data network via the network without accessing a database, approve the non-priority UE to receive non-priority access to the external data network via the network.

In at least some of the above embodiments, the network is a visited network having a roaming agreement with a home network of the non-priority UE, and the clearinghouse server is configured to (a) receive the request for the non-priority UE to access the external data network via the visited network from a visited network server of the visited network; (b) communicate with (i) a home network server of the home network or (ii) a centralized authentication server to determine whether the non-priority UE is permitted to access the external data network via the visited network; and (c) transmit, to the visited network server, approval for the non-priority UE to receive access to the external data network via the visited network.

In at least some of the above embodiments, the network is a home network of the non-priority UE, and the clearinghouse server is configured to (a) receive the request for the non-priority UE to access the external data network via the home network from a home network server of the home network; (b) communicate with (i) the home network server or (ii) a centralized authentication server to determine whether the non-priority UE is permitted to access the external data network via the home network; and (c) transmit, to the home network server, approval for the non-priority UE to receive access to the external data network via the home network.

In at least some of the above embodiments, upon determining that (i) the priority UE is permitted to access the external data network via the network and (ii) a current emergency situation has not been declared for the network, the clearinghouse server is configured to approve the priority UE to receive non-priority access to the external data network via the network.

In at least some of the above embodiments, upon determining that (i) the priority UE is permitted to access the external data network via the network and (ii) a current emergency situation has not been declared for the network, the clearinghouse server is configured to deny access by the priority UE to the external data network via the network.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A clearinghouse server comprising:
- at least one processor; and
- at least one memory storing instructions that, upon being executed by the at least one processor, cause the clearinghouse server at least to:
  - receive, from a network server of a network, a request for a priority user equipment (UE) to access an external data network via the network;
  - determine whether a current emergency situation has been declared for the network;
  - determine whether the priority UE is permitted to access the external data network via the network; and
  - upon determining that (i) the priority UE is permitted to access the external data network via the network and (ii) a current emergency situation has been declared for the network, approve the priority UE to receive priority access to the external data network via the network, wherein:
    - the network is a visited network having a roaming agreement with a home network of the priority UE; and
    - the clearinghouse server is configured to:
      - receive the request for the priority UE to access the external data network via the visited network from a visited network server of the visited network;
      - communicate with (i) a home network server of the home network or (ii) a centralized authentication server to determine whether the priority UE is permitted to access the external data network via the visited network; and
      - transmit, to the visited network server, approval for the priority UE to receive access to the external data network via the visited network.

2. The clearinghouse server of claim 1, wherein the clearinghouse server is configured to:
- receive a clearinghouse serial number for the current emergency situation;
- receive a home serial number for the current emergency situation from the home network server or the centralized authentication server; and
- compare the home serial number to the clearinghouse serial number to confirm whether the priority UE should receive priority access to the external data network via the visited network.

3. The clearinghouse server of claim 1, wherein the clearinghouse server is configured to:
- receive location information associated with the priority UE and/or the network; and
- access a database to determine whether a current emergency situation has been declared for the network based on the location information.

4. The clearinghouse server of claim 1, wherein, upon determining that (i) the priority UE is permitted to access the external data network via the network and (ii) a current emergency situation has not been declared for the network, the clearinghouse server is configured to approve the priority UE to receive non-priority access to the external data network via the network.

5. The clearinghouse server of claim 1, wherein, upon determining that (i) the priority UE is permitted to access the external data network via the network and (ii) a current emergency situation has not been declared for the network, the clearinghouse server is configured to deny access by the priority UE to the external data network via the network.

6. The clearinghouse server of claim 1, wherein the network is a wireless WiFi network.

7. A method comprising a clearinghouse server:
- receiving, from a network server of a network, a request for a priority user equipment (UE) to access an external data network via the network;
- determining whether a current emergency situation has been declared for the network;
- determining whether the priority UE is permitted to access the external data network via the network; and
- upon determining that (i) the priority UE is permitted to access the external data network via the network and (ii) a current emergency situation has been declared for the network, approving the priority UE to receive priority access to the external data network via the network, wherein:
  - the network is a visited network having a roaming agreement with a home network of the priority UE; and
  - the clearinghouse server:
    - receives the request for the priority UE to access the external data network via the visited network from a visited network server of the visited network;
    - communicates with (i) a home network server of the home network or (ii) a centralized authentication server to determine whether the priority UE is permitted to access the external data network via the visited network; and
    - transmits, to the visited network server, approval for the priority UE to receive access to the external data network via the visited network.

8. The method of claim 7, wherein the clearinghouse server:
- receives a clearinghouse serial number for the current emergency situation;
- receives a home serial number for the current emergency situation from the home network server or the centralized authentication server; and
- compares the home serial number to the clearinghouse serial number to confirm whether the priority UE should receive priority access to the external data network via the visited network.

9. The method of claim 7, wherein the clearinghouse server:
- receives location information associated with the priority UE and/or the network; and
- accesses a database to determine whether a current emergency situation has been declared for the network based on the location information.

10. The method of claim 7, wherein, upon determining that (i) the priority UE is permitted to access the external data network via the network and (ii) a current emergency situation has not been declared for the network, the clearinghouse server approves the priority UE to receive non-priority access to the external data network via the network.

11. The method of claim 7, wherein, upon determining that (i) the priority UE is permitted to access the external data network via the network and (ii) a current emergency situation has not been declared for the network, the clearinghouse server denies access by the priority UE to the external data network via the network.

12. The method of claim 7, wherein the network is a wireless WiFi network.

13. A clearinghouse server comprising:
at least one processor; and
at least one memory storing instructions that, upon being executed by the at least one processor, cause the clearinghouse server at least to:
receive, from a network server of a network, a request for a priority user equipment (UE) to access an external data network via the network;
determine whether a current emergency situation has been declared for the network;
determine whether the priority UE is permitted to access the external data network via the network; and
upon determining that (i) the priority UE is permitted to access the external data network via the network and (ii) a current emergency situation has been declared for the network, approve the priority UE to receive priority access to the external data network via the network, wherein:
the network is a home network of the priority UE; and
the clearinghouse server is configured to:
receive the request for the priority UE to access the external data network via the home network from a home network server of the home network;
communicate with (i) the home network server or (ii) a centralized authentication server to determine whether the priority UE is permitted to access the external data network via the home network; and
transmit, to the home network server, approval for the priority UE to receive access to the external data network via the home network, wherein the clearinghouse server is configured to:
receive a clearinghouse serial number for the current emergency situation;
receive a home serial number for the current emergency situation from the home network server or the centralized authentication server; and
compare the home serial number to the clearinghouse serial number to confirm whether the priority UE should receive priority access to the external data network via the home network.

14. A clearinghouse server comprising:
at least one processor; and
at least one memory storing instructions that, upon being executed by the at least one processor, cause the clearinghouse server at least to:
receive, from a network server of a network, a request for a priority user equipment (UE) to access an external data network via the network;
determine whether a current emergency situation has been declared for the network;
determine whether the priority UE is permitted to access the external data network via the network; and
upon determining that (i) the priority UE is permitted to access the external data network via the network and (ii) a current emergency situation has been declared for the network, approve the priority UE to receive priority access to the external data network via the network, wherein:
the clearinghouse server is further configured to:
receive, from the network server of the network, a request for a non-priority UE to access the external data network via the network;
determine whether the non-priority UE is permitted to access the external data network via the network without accessing a database; and
upon determining that the non-priority UE is permitted to access the external data network via the network without accessing a database, approve the non-priority UE to receive non-priority access to the external data network via the network, wherein:
the network is a visited network having a roaming agreement with a home network of the non-priority UE; and
the clearinghouse server is configured to:
receive the request for the non-priority UE to access the external data network via the visited network from a visited network server of the visited network;
communicate with (i) a home network server of the home network or (ii) a centralized authentication server to determine whether the non-priority UE is permitted to access the external data network via the visited network; and
transmit, to the visited network server, approval for the non-priority UE to receive access to the external data network via the visited network.

15. A clearinghouse server comprising:
at least one processor; and
at least one memory storing instructions that, upon being executed by the at least one processor, cause the clearinghouse server at least to:
receive, from a network server of a network, a request for a priority user equipment (UE) to access an external data network via the network;
determine whether a current emergency situation has been declared for the network;
determine whether the priority UE is permitted to access the external data network via the network; and
upon determining that (i) the priority UE is permitted to access the external data network via the network and (ii) a current emergency situation has been declared for the network, approve the priority UE to receive priority access to the external data network via the network, wherein:
the clearinghouse server is further configured to:
receive, from the network server of the network, a request for a non-priority UE to access the external data network via the network;
determine whether the non-priority UE is permitted to access the external data network via the network without accessing a database; and
upon determining that the non-priority UE is permitted to access the external data network via the network without accessing a database, approve the non-priority UE to receive non-priority access to the external data network via the network, wherein:
the network is a home network of the non-priority UE; and the clearinghouse server is configured to:
receive the request for the non-priority UE to access the external data network via the home network from a home network server of the home network;
communicate with (i) the home network server or (ii) centralized authentication server to determine whether the non-priority UE is permitted to access the external data network via the home network; and
transmit, to the home network server, approval for the non-priority UE to receive access to the external data network via the home network.

16. A method comprising a clearinghouse server:
receiving, from a network server of a network, a request for a priority user equipment (UE) to access an external data network via the network;
determining whether a current emergency situation has been declared for the network;
determining whether the priority UE is permitted to access the external data network via the network; and
upon determining that (i) the priority UE is permitted to access the external data network via the network and (ii) a current emergency situation has been declared for the network, approving the priority UE to receive priority access to the external data network via the network, wherein:
the network is a home network of the priority UE; and
the clearinghouse server:
receives the request for the priority UE to access the external data network via the home network from a home network server of the home network;
communicates with (i) the home network server or (ii) a centralized authentication server to determine whether the priority UE is permitted to access the external data network via the home network; and
transmits, to the home network server, approval for the priority UE to receive access to the external data network via the home network, wherein the clearinghouse server:
receives a clearinghouse serial number for the current emergency situation;
receives a home serial number for the current emergency situation from the home network server or the centralized authentication server; and
compares the home serial number to the clearinghouse serial number to confirm whether the priority UE should receive priority access to the external data network via the home network.

17. A method comprising a clearinghouse server:
receiving, from a network server of a network, a request for a priority user equipment (UE) to access an external data network via the network;
determining whether a current emergency situation has been declared for the network;
determining whether the priority UE is permitted to access the external data network via the network; and
upon determining that (i) the priority UE is permitted to access the external data network via the network and (ii) a current emergency situation has been declared for the network, approving the priority UE to receive priority access to the external data network via the network, wherein:
the clearinghouse server:
receives, from the network server of the network, a request for a non-priority UE to access the external data network via the network;
determines whether the non-priority UE is permitted to access the external data network via the network without accessing a database; and
upon determining that the non-priority UE is permitted to access the external data network via the network without accessing a database, approves the non-priority UE to receive non-priority access to the external data network via the network, wherein:
the network is a visited network having a roaming agreement with a home network of the non-priority UE; and
the clearinghouse server:
receives the request for the non-priority UE to access the external data network via the visited network from a visited network server of the visited network;
communicates with (i) a home network server of the home network or (ii) a centralized authentication server to determine whether the non-priority UE is permitted to access the external data network via the visited network; and
transmits, to the visited network server, approval for the non-priority UE to receive access to the external data network via the visited network.

18. A method comprising a clearinghouse server:
receiving, from a network server of a network, a request for a priority user equipment (UE) to access an external data network via the network;
determining whether a current emergency situation has been declared for the network;
determining whether the priority UE is permitted to access the external data network via the network; and
upon determining that (i) the priority UE is permitted to access the external data network via the network and (ii) a current emergency situation has been declared for the network, approving the priority UE to receive priority access to the external data network via the network, wherein:
the clearinghouse server:
receives, from the network server of the network, a request for a non-priority UE to access the external data network via the network;
determines whether the non-priority UE is permitted to access the external data network via the network without accessing a database; and
upon determining that the non-priority UE is permitted to access the external data network via the network without accessing a database, approves the non-priority UE to receive non-priority access to the external data network via the network, wherein:
the network is a home network of the non-priority UE; and
the clearinghouse server:
receives the request for the non-priority UE to access the external data network via the home network from a home network server of the home network;
communicates with (i) the home network server or (ii) a centralized authentication server to determine whether the non-priority UE is permitted to access the external data network via the home network; and transmits, to the home network server, approval for the non-priority UE to receive access to the external data network via the home network.

* * * * *